INVENTOR.
THACKSTON THOMAS
BY
Attorney

Patented Nov. 13, 1951

2,574,769

UNITED STATES PATENT OFFICE 2,574,769

SUPPORTING STRUCTURE FOR KITCHEN APPLIANCES

Thackston Thomas, Santa Monica, Calif.

Application November 15, 1949, Serial No. 127,284

14 Claims. (Cl. 312—22)

My invention relates generally to kitchen appliances, such as food mixers, juice extractors, meat grinders, and similar devices. More particularly, my invention relates to a structure for supporting such appliance so that it may be quickly and easily moved from storage to utility position, and vice versa.

Kitchen appliances of the class described have come into wide use, and at the present time, form almost indispensable items of household equipment. Many of the larger, power-driven devices of this class are used in the preparation of almost every meal and consequently should be stored in such a position and manner as to be readily available to the housewife. By reason of the weight and size of such articles, however, they are often difficult to handle and may have to be disassembled for storage. Thus, in many instances, the housewife prefers to leave the device assembled and on the kitchen counter or other position of use, rather than to attempt to place the device in a cupboard or other space when it is not in use. Such practice is undesirable, not only because of the waste in counter space, but because of the unsightliness of the device left so exposed to view, and the possibility of collecting dirt and other contamination on the unit when it is not placed in a closed storage space.

Bearing in mind the desiderata and the difficulties just described, it is a major object of the present invention to provide a supporting structure for kitchen appliances of the class described which may quickly and easily be operated to place the appliance either in a utility position or a storage position, as desired.

It is another object of the invention to provide such a structure which supports the appliance firmly against possible upsetting while it is being used.

It is still another object of the invention to provide such a structure which may be installed in an existing conventional kitchen counter without the necessity of extensive modification and reconstruction.

It is a further object of the invention to provide in a structure of the class described means for assisting the housewife in raising the appliance to a position of use so as to require a minimum of exertion in moving the unit from a position of storage to a position of use, or vice versa.

Figure 1:
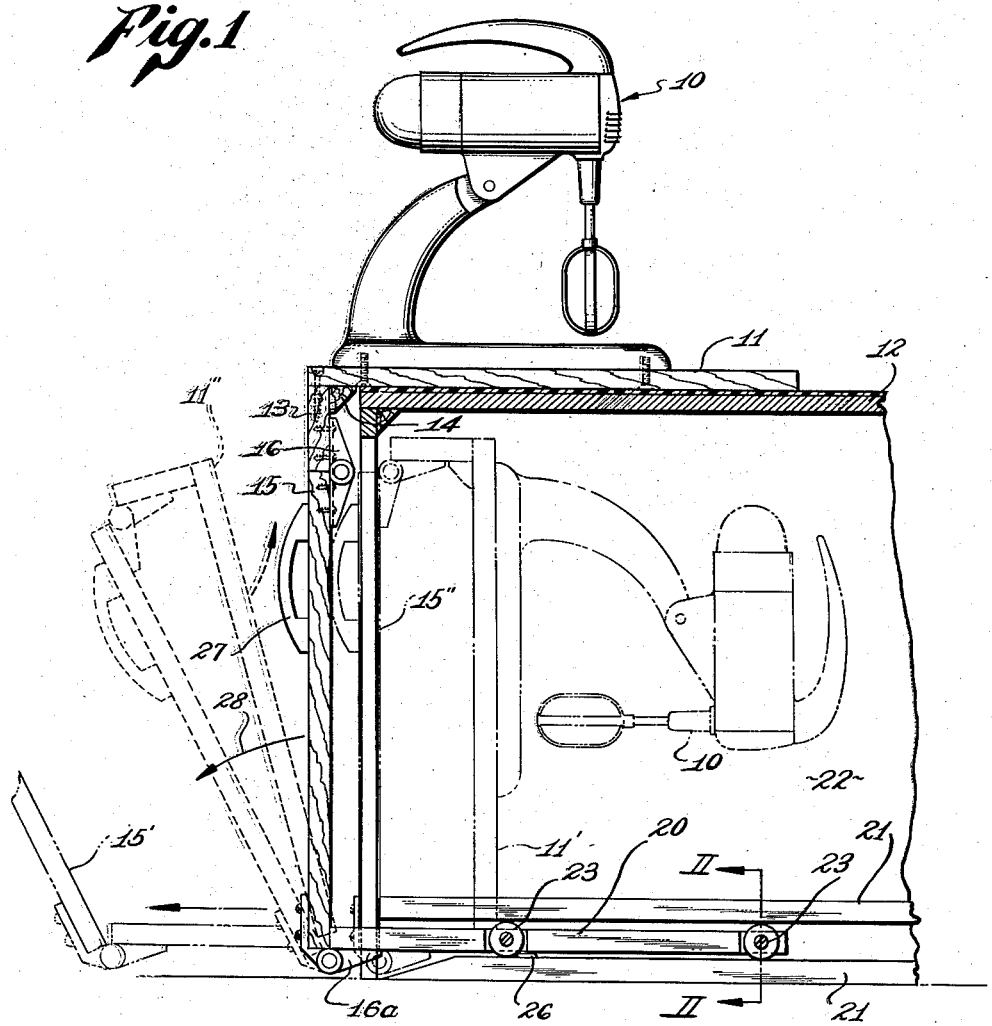
Figure 2:
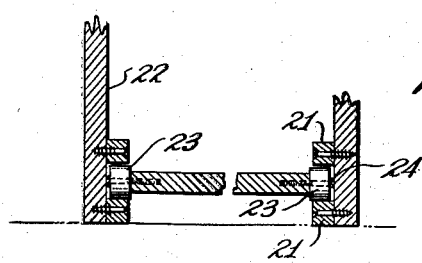

The foregoing and additional objects and advantages of the invention will be apparent from a consideration of the following detailed description thereof, consideration being given likewise to the attached drawings, in which:

Figure 1 is a partially sectioned elevational view of the supporting structure embodying the present invention, employed to support an electrically powered food mixer; and Figure 2 is an elevational section taken on the line 2—2 in Figure 1.

In the drawings, I have identified a conventional electrically driven food mixer by the reference character 10. The mixer 10 faces rearwardly from the front of a kitchen counter 12, and is secured to a horizontal base 11 which is adapted by the structure hereinafter to be described to be moved from the utility position shown in full-line in Figure 1, wherein the shelf rests on the top of the counter 12, to a vertical storage position shown in phantom line in Figure 1 and identified by the reference character 11'. It will be realized that the structure hereinafter described can be attached to any table-like means having a horizontal work surface. The counter shown herein is used illustratively and by way of example only.

The supporting base 11 includes a depending skirt member 13, secured to a front edge thereof and reinforced by a triangular glue block 14 or other similar means. The skirt member 13 is movably secured to the upper edge of a door 15, the lower edge of the skirt and the upper edge of the door being in abutting relationship. The members 13 and 15 are secured together with a pair of spring hinges 16 of conventional design such as employed for example on screen doors. The bias of the hinges is such as to hold them in aligned position with the skirt member 13 upright, as shown in full-line in Figure 1.

The lower edge of the door 15 is in turn secured to the forward edge of a horizontal sliding shelf member 20, the connection again being by means of spring hinges 16a. The hinges 16a are biased to urge the door 15 into a vertical position, as shown in full-line in Figure 1. The swinging movement of the door 15 is limited by its striking the front edge of the sliding shelf 20 when reaching a vertical position. Similarly, the movement of the skirt is limited in a vertical position thereof by the abutting edges of the door 15 and the skirt.

The shelf 20 is supported for sliding movement in a horizontal plane by means of guide members 21, positioned above and below the plane of the shelf 20 and secured to upright partitions 22 which form the sides of a storage compartment under the counter 12. To facilitate the sliding movement just referred to, the shelf may be equipped with rollers 23 secured thereto by pivot screws 24, as can be seen best in Figure 2. The diameter of the rollers 23 is such as to roll freely between the guides 21. Means are provided to limit the sliding movement of the shelf 20, such means being, in the present embodiment, a small block 26 secured to one of the guides 21. Thus, it will be seen that by reason of the block 26, the shelf 20 may not be entirely withdrawn from the space between the guides 21. Other limiting means for the shelf 20 may be used without departure from the spirit of this invention.

The operation of the device is as follows. When it is desired to use the mixer 10, it is placed in the position shown in full-line in Figure 1. When in this position, the mixer 10 may be operated in the usual manner, and is held firmly against possible upsetting or displacement by reason of its attachment to the base 11, and the attachment of the latter to the door 15.

In order to move the mixer 10 to a storage position, the door 15 is pulled outwardly, sliding the base 11 off of the top of the counter 12. A handle 27 is secured to the front of the door 15 to facilitate handling of the device.

It will be noted that when the mixer 10 is in a raised or utility position, its center of gravity is relatively close to the axis of the hinge 16, as compared to the disposition thereof when the mixer is in the storage position shown in phantom line in Figure 1. The bias of the spring hinge 16 is sufficient to just support the base 11 in a horizontal position without the asistance of the counter top 12.

Accordingly, when the door 15 is withdrawn to the limit of sliding movement of the shelf 20, it may be tilted outwardly in the direction of the arrow 28 in Figure 1, to the sloping position indicated by the reference character 15' in Figure 1. Such outward tilting movement of the door 15 is, of course, resisted by the spring bias of the hinges 16a. When the door 15 has been tilted back to the position indicated by the reference character 15', a slight forward pressure on the mixer 10 will overbalance the same and permit it and the base 11 to tilt forwardly into the position indicated by the reference character 11" in Figure 1.

Thereafter, the door 15 is allowed to return to its vertical position and is pushed back under the counter 12 to the position 15" to place the mixer in storage position in the compartment under the counter 12. Due to the aforementioned displacement of the center of gravity with respect to the axis of the hinges 16, the mixer 10 will remain in the storage position with the rearward edge of the base 11 resting on the horizontal shelf 20.

When it is desired to again place the mixer 10 in storage position, the foregoing operation is reversed, i. e., the door 15 is pulled outwardly, tilted outwardly, and the base 11 lifted (by means of the mixer 10) to a horizontal position and slid forwardly onto the top of the counter 12. A relatively small effort is required to lift the mixer from its storage position to its upright position by reason of the assistance given by the spring hinges 16.

While the structure shown and described herein is fully capable of achieving the objects and providing the advantages hereinbefore set forth, it is realized that considerable modification can be made without departing from the spirit of the invention. For this reason, I do not mean to be limited to the form shown and described, but rather to the scope of the appended claims.

I claim:

1. In an appliance-supporting structure of the class described: a base adapted to receive an appliance secured thereto and to rest flat on a horizontal surface to support said appliance in a normally upright position, said base having a skirt portion overhanging said horizontal surface; and a normally vertical panel hingedly secured adjacent an upper edge thereof to said skirt portion and extending downwardly therefrom, said panel being hingedly supported by its lower edge for swinging movement to an inclined position to permit said base to be swung downwardly about said upper panel edge to a position substantially parallel to said panel whereby to place said appliance in a storage position under said surface when said panel is swung back to a vertical position.

2. In an appliance-supporting structure of the class described: a base adapted to receive an appliance secured thereto and to rest flat on a horizontal surface to support said appliance in a normally upright position and having a front skirt overhanging said horizontal surface; a normally vertical panel hingedly secured adjacent an upper edge thereof to said skirt and extending downwardly therefrom, said panel being hingedly supported by its lower edge for swinging movement to an inclined position to permit said base to be swung downwardly about said upper panel edge to a position substantially parallel to said panel whereby to place said appliance in a storage position under said surface when said panel is swung back to a vertical position; and spring means connected between said skirt and panel and biased to resist said downwardly swinging movement.

3. In an appliance-supporting structure of the class described: a base adapted to receive an appliance secured thereto and to rest flat on a horizontal surface to support said appliance in a normally upright position, said base having a front skirt overhanging said horizontal surface; a normally vertical panel hingedly secured adjacent an upper edge thereof to said skirt and extending downwardly therefrom, said panel being hingedly supported by its lower edge for swinging movement to an inclined position to permit said base to be swung downwardly about said upper panel edge to a position substantially parallel to said panel whereby to place said appliance in a storage position under said surface when said panel is swung back to a vertical position; and spring means secured to said panel and biased to urge said panel toward a vertical position.

4. In an appliance-supporting structure of the class described: a base adapted to receive an appliance secured thereto and to rest flat on a horizontal surface to support said appliance in a normally upright position, said base having a front skirt overhanging said horizontal surface; a normally vertical panel hingedly secured adjacent an upper edge thereof to said skirt and extending downwardly therefrom, said panel being hingedly supported by its lower edge for swinging movement to an inclined position to permit said base to be swung downwardly about said upper panel edge to a position substantially parallel to said panel whereby to place said appliance in a storage position under said surface when said panel is swung back to a vertical position; first spring means connected between said skirt and panel and biased to resist said downward swinging movement; and second spring means secured to said panel and biased to urge said panel toward a vertical position.

5. In an appliance-supporting structure of the class described: a base adapted to receive an appliance secured thereto and to rest on a horizontal surface to support said appliance in an upright position; a shelf spaced from, and normally underlying said base, said shelf being supported for limited sliding movement in a horizontal plane; and a normally vertical panel hingedly secured adjacent an upper edge thereof to said base, and adjacent a lower edge thereof to said shelf to permit outward tilting movement of said panel with respect to said shelf, and downward swinging movement of said base to a position substantially parallel to said panel.

6. In an appliance-supporting structure of the class described: a base adapted to receive an appliance secured thereto and to rest on a horizontal surface to support said appliance in an upright position; a shelf spaced from, and normally underlying said base, said shelf being supported for limited sliding movement in a horizontal plane; a normally vertical panel hingedly secured adjacent an upper edge thereof to said base, and adjacent a lower edge thereof to said shelf to permit outward tilting movement of said panel with respect to said shelf, and downward swinging movement of said base to a position substantially parallel to said panel; and spring means connected between said base and panel and biased to resist said swinging movement of said base.

7. In an appliance-supporting structure of the class described: a base adapted to receive an appliance secured thereto and to rest on a horizontal surface to support said appliance in an upright position; a shelf spaced from, and normally underlying said base, said shelf being supported for limited sliding movement in a horizontal plane; a normally vertical panel hingedly secured adjacent an upper edge thereof to said base, and adjacent a lower edge thereof to said shelf to permit outward tilting movement of said panel with respect to said shelf, and downward swinging movement of said base to a position substantially parallel to said panel; and spring means connected between said shelf and panel and biased to urge said panel toward said normally vertical position thereof.

8. In an appliance-supporting structure of the class described: a base adapted to receive an appliance secured thereto and to rest on a horizontal surface to support said appliance in an upright position; a shelf spaced from, and normally underlying said base, said shelf being supported for limiting sliding movement in a horizontal plane; a normally vertical panel hingedly secured adjacent an upper edge thereof to said base, and adjacent a lower edge thereof to said shelf to permit outward tilting movement of said panel with respect to said shelf, and downward swinging movement of said base to a position substantially parallel to said panel; first spring means connected between said base and panel and biased to resist said swinging movement of said base; and second spring means connected between said shelf and panel, biased to urge said panel toward said vertical position thereof.

9. In an appliance-supporting structure of the class described: a base adapted to receive an appliance secured thereto and to rest flat on a horizontal surface to support said appliance in an upright position, said base having a downwardly projecting skirt portion fixed to the front edge thereof and adapted to overhang said horizontal surface; a shelf spaced from, and normally underlying said base, said shelf being supported for limited linear sliding movement in a horizontal plane; and a panel secured to said shelf adjacent an outer edge thereof disposed transversely to the direction of said sliding movement and extending upwardly from said shelf substantially at right angles thereto, said panel having an upper edge thereof disposed below said horizontal surface and hingedly secured to said skirt portion adjacent a lower edge thereof whereby said base may be swung downwardly to a position below said surface when said shelf is at an outer limit of said sliding movement and whereby to place said appliance in a position of storage under said surface when said shelf is returned to said normal position thereof.

10. In an appliance-supporting structure of the class described: table-like means having a horizontal work surface and a storage space beneath said surface, said space having a forward opening; a flat appliance base adapted to rest selectively in horizontal position on top of said surface or in vertical position in said space adjacent said opening; a vertical closure member normally positioned in said opening, said closure member being mounted for outward movement to open said opening; and hinge means connected between said closure means and base, said hinge means having a horizontal axis adjacent the top of said opening whereby said outward movement of said closure means draws said base off of said surface and permits the same to fold downwardly toward said closure means for placement in said space when said closure is replaced in said opening.

11. In an appliance-supporting structure of the class described: a table-like enclosure having a flat top and substantially parallel sides defining a storage space beneath said top, said space having a front opening; a horizontal shelf slidingly supported on said sides adjacent the bottom of said space for limited horizontal inward and outward movement through said opening; a vertical door for said opening secured to a front edge of said shelf and extending upwardly therefrom whereby said movement of said shelf opens and closes said opening, said door and shelf being connected by a hinge connection whereby to permit outward swinging movement of said door with respect to said opening; and movable means including an appliance base and a hinge connecting said base to an upper edge of said door for swinging movement from a horizontal position in which said base rests on said top and a vertical position in which said base is substantially parallel to said door adjacent the inner surface thereof.

12. The construction of claim 11 further characterized by having a spring operatively associated with said door-shelf hinge connection and biased to urge said door to a vertical position.

13. An appliance-supporting structure comprising: a cupboard-like enclosure having a horizontal top and an opening in a vertical wall thereof; a door supported in said opening to normally close the same, said door having an upper horizontal edge below said top and being movable to move said upper edge outwardly to open said opening; an appliance-receiving base adapted to rest flat on said top and having a dependent member overhanging an edge of said top and abutting said door edge; and a hinge connection between said member and door whereby said door edge may be moved outwardly to draw said base off of said top and permit the same to fold flat against said door for storage within said enclosure when said door is returned to normally closed position.

14. The construction of claim 13 further characterized in that said door is hingedly supported by its lower edge.

THACKSTON THOMAS.

REFERENCES CITED

The following references are of record in the file of this patent:

UNITED STATES PATENTS

| Number | Name | Date |
| --- | --- | --- |
| 282,087 | Jowett | July 31, 1883 |
| 1,648,529 | Zostas | Nov. 8, 1927 |
| 1,994,742 | Altofer | Mar. 19, 1935 |
| 2,133,807 | Bushnell | Oct. 18, 1938 |
| 2,200,919 | Fritch | May 14, 1940 |
| 2,353,331 | Hall | July 11, 1944 |